(12) United States Patent
Harris et al.

(10) Patent No.: US 9,109,398 B2
(45) Date of Patent: Aug. 18, 2015

(54) METHOD FOR FORMING A GEOTHERMAL WELL

(71) Applicants: Willard D. Harris, Spring, TX (US); Michael Batten, Conroe, TX (US)

(72) Inventors: Willard D. Harris, Spring, TX (US); Michael Batten, Conroe, TX (US)

(73) Assignee: Mechanical & Electrical Concepts, Inc., Houston, TX (US)

( * ) Notice: Subject to any disclaimer, the term of this patent is extended or adjusted under 35 U.S.C. 154(b) by 283 days.

(21) Appl. No.: 13/663,265

(22) Filed: Oct. 29, 2012

(65) Prior Publication Data

US 2013/0112402 A1     May 9, 2013

Related U.S. Application Data

(60) Provisional application No. 61/553,019, filed on Oct. 28, 2011.

(51) Int. Cl.
| | |
|---|---|
| *E21B 7/04* | (2006.01) |
| *F24J 3/08* | (2006.01) |
| *E21B 7/00* | (2006.01) |
| *E21B 43/30* | (2006.01) |
| *E21B 7/06* | (2006.01) |

(52) U.S. Cl.
CPC . *E21B 7/00* (2013.01); *E21B 7/067* (2013.01); *E21B 43/30* (2013.01); *F24J 3/083* (2013.01); *E21B 7/04* (2013.01); *F24J 3/081* (2013.01); *F24J 2003/088* (2013.01); *Y02E 10/12* (2013.01); *Y02E 10/125* (2013.01)

(58) Field of Classification Search
CPC ............ Y02E 10/12; F24J 3/081; F24J 3/082; F24J 3/083; F24J 2003/088
USPC ............................................. 165/45; 175/61
See application file for complete search history.

(56) References Cited

U.S. PATENT DOCUMENTS

| | | | | |
|---|---|---|---|---|
| 6,000,471 | A * | 12/1999 | Langset | 166/268 |
| 2006/0124360 | A1 * | 6/2006 | Lee et al. | 175/61 |
| 2011/0247816 | A1 * | 10/2011 | Carter, Jr. | 166/298 |
| 2012/0080163 | A1 * | 4/2012 | Hoffman | 165/45 |
| 2013/0042997 | A1 * | 2/2013 | Yang | 165/45 |
| 2013/0081782 | A1 * | 4/2013 | Alrashidi | 165/45 |

\* cited by examiner

*Primary Examiner* — Giovanna Wright
(74) *Attorney, Agent, or Firm* — Edmonds & Nolte, P.C.

(57) ABSTRACT

Methods for forming a geothermal well are provided. A method for forming a geothermal well can include drilling a first wellbore having a substantially linear segment connected to an arcuate segment. A second wellbore can be drilled to connect to a terminating end of the arcuate segment, thereby forming a wellbore loop. A thermally conductive tube can be disposed through the wellbore loop.

19 Claims, 6 Drawing Sheets

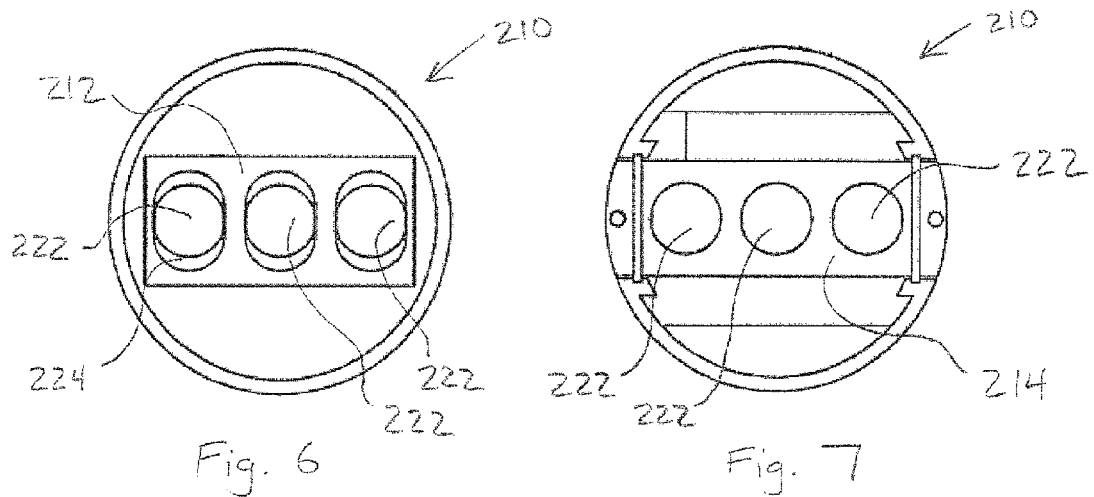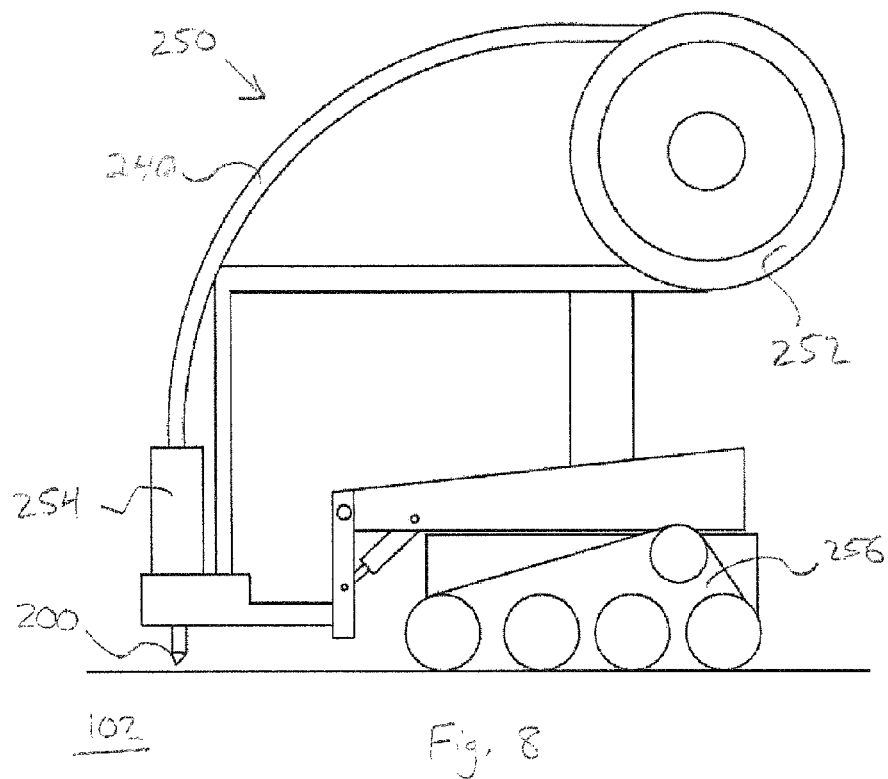

METHOD FOR FORMING A GEOTHERMAL WELL

CROSS-REFERENCE TO RELATED APPLICATION

This application claims priority to U.S. Provisional Patent Application having Ser. No. 61/553,019, filed Oct. 28, 2011, which is incorporated by reference herein.

BACKGROUND

1. Field

Embodiments described generally relate to methods for forming a geothermal well. More particularly, such embodiments relate to methods for drilling a geothermal wellbore loop and flowing a fluid medium through the wellbore loop to exchange heat with a subsurface environment.

2. Description of the Related Art

A geothermal wellbore generally encases vertical supply and return pipes that are parallel to one another and connected with a U-shaped bend at the bottom. A fluid medium flows down the supply pipe and back up the return pipe exchanging heat with the surrounding subsurface environment throughout the flow path. However, as the supply and return pipes are disposed in the same wellbore and separated by only a few inches, an undesirable transfer of heat occurs between the supply and return pipes, thus resulting in a significant efficiency loss to the system.

There is a need, therefore, for new methods to substantially eliminate the undesirable transfer of heat between the supply and return pipes in a geothermal wellbore.

SUMMARY

In at least one embodiment, a first wellbore can be drilled having a substantially linear segment connected to an arcuate segment. A second wellbore can be drilled to connect to a terminating end of the arcuate segment, thereby forming a wellbore loop. A thermally conductive tube can be disposed through the wellbore loop.

In at least one embodiment, a fluid can flow through a tube having a high thermal conductivity. The tube can be disposed through a wellbore loop. The wellbore loop can include a first wellbore having a substantially linear segment and an arcuate segment. The arcuate segment can have a first end and a second end, and the first end can be connected to the substantially linear segment. The wellbore loop can also include a second wellbore connected to the second end of the arcuate segment.

In at least one embodiment, a first substantially linear segment can be drilled from a first point located at a surface to a second point located in a subsurface environment. A second substantially linear segment can be drilled from a third point located at the surface to a fourth point located in the subsurface environment. The first and second substantially linear segments can be separated by a distance to prevent geothermal heat transfer between the first and second substantially linear segments. A third arcuate segment can extend from the fourth point to the second point, thereby forming a wellbore loop. A thermally conductive tube can be disposed through the wellbore loop.

BRIEF DESCRIPTION OF THE DRAWINGS

FIG. 6 depicts an end view of an illustrative knuckle directed toward the coupler, according to one or more embodiments described.

FIG. 7 depicts an end view of an illustrative knuckle directed toward the recess, according to one or more embodiments described.

FIG. 8 depicts an illustrative loop drilling unit, according to one or more embodiments described.

DETAILED DESCRIPTION

Figure 1:
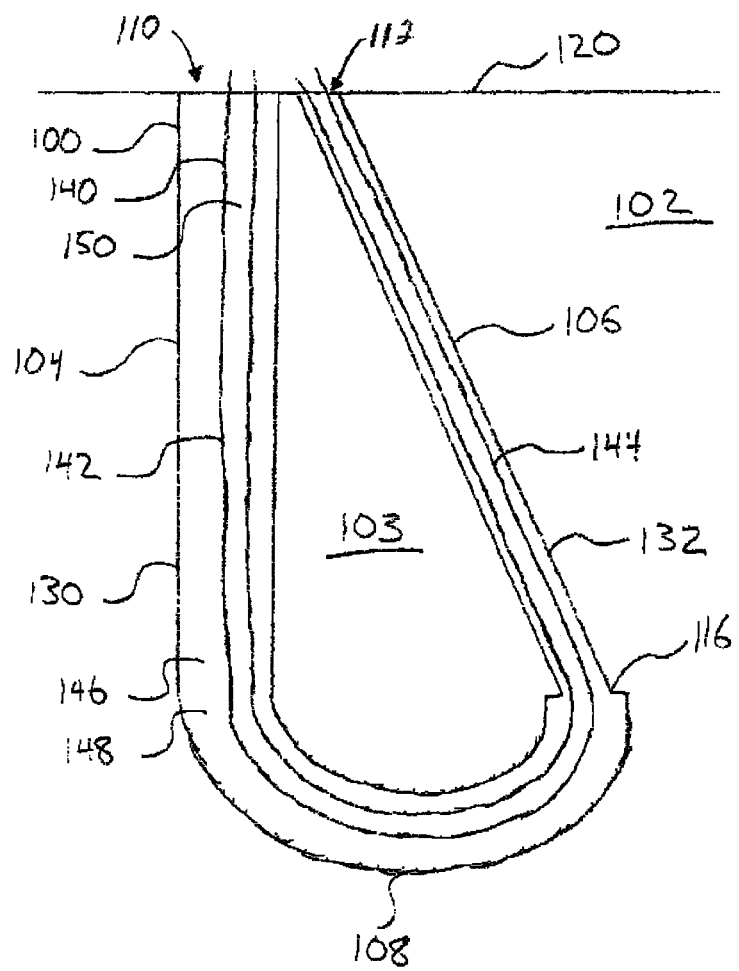
FIG. 1 depicts a cross-sectional view of an illustrative wellbore loop, according to one or more embodiments described.

FIG. 1 depicts a cross-sectional view of an illustrative wellbore loop 100, according to one or more embodiments. The wellbore loop 100 can be disposed in a subsurface environment 102 and can be used in geothermal well applications, such as geothermal cooling or heating applications. For example, a fluid medium 150 can flow through a tube 140 disposed in the wellbore loop 100, and geothermal heat transfer can take place between the fluid medium 150 and the surrounding subsurface environment 102. The fluid medium 150 can be a liquid, gas, or two a two phase mixture. The subsurface environment 102 can include, but is not limited to, dirt, sand, clay, silt, and rock.

The wellbore loop 100 can have a first segment 104 and a second segment 106 coupled together with an arcuate bottom segment 108. As shown, the first segment 104 can be substantially vertical and the second segment 106 can be angled with respect to vertical; however, either segment 104, 106 can be vertical, substantially vertical, angled, linear, or arcuate. The angle can vary depending on the desired outcome. Although a specific loop 100 design has been shown, it is understood that such is merely by way of example and is not intended to limit the scope of the claims presented herein. As can be appreciated, the configuration of the wellbore loop 100 can be altered to avoid underground obstacles, such as hardened formations, or to maintain the wellbore loop 100 within a prescribed underground property line.

The first segment 104 can have a first entry point 110 located at the surface 120, and the second segment 106 can have a second entry point 112 located at the surface 120. In one or more embodiments, the first and second entry points 110,112 can be separated a distance ranging from a low of about 0.25 m, about 0.5 m, or about 1 m to a high of about 5 m, about 10 m, or about 20 m.

The wellbore loop 100 can be formed by drilling a continuous loop in the subsurface environment 102. After the continuous wellbore loop 100 has been drilled, a drill string 240 (see FIG. 8) will be disposed through the wellbore loop 100. One end of a heat transfer tube 140 can be attached to an end of the drill string 240, and the drill string 240 can be pulled back through the wellbore loop 100 to the point where drilling originated, thereby locating the tube 140 in the wellbore loop 100.

In another embodiment, the wellbore loop 100 can be formed by drilling two separate wellbores 130 and 132 that intersect at point 116. As may be appreciated, drilling the second wellbore 132 can relieve the task of drilling upward. A positioning device can be disposed within the drill head assembly 200 (see FIG. 2) of the first wellbore 130 and/or the drill head assembly 200 of the second wellbore 132. In one or more embodiments, the drill head assembly 200 of the first wellbore 130 can drill to point 116, and a position reading can be taken. The second wellbore 132 can then be drilled to intersect the first wellbore 130, thereby forming the wellbore loop 100. In another embodiment, the drill head assembly 200 of the second wellbore 132 can drill to point 116, and a position reading can be taken. The first wellbore 130 can then be drilled to intersect the second wellbore 132, thereby forming the wellbore loop 100. In one or more embodiments, the positioning device can be a radio frequency transmitter or a GPS transmitter.

The first wellbore 130 can require a directional drilling assembly to drill the arcuate bottom segment 108. The second wellbore 132 can be drilled with either a directional drilling assembly or a straight-line drilling assembly. In one or more embodiments, the directional drilling assembly can require a larger diameter than the straight-line drilling assembly, and as a result, the first wellbore 130 can have a larger diameter than the second wellbore 132. In one or more embodiments, the first wellbore 130 can have a diameter of about 7.5 cm and the second wellbore 132 can a diameter of about 2.5 cm. As can be appreciated, however, a range of wellbore diameters are contemplated herein without departing from the scope of the disclosure, including, but not limited to, a uniform diameter throughout the wellbore loop 100.

After the first wellbore 130 and second wellbore 132 intersect to form the wellbore loop 100, the heat transfer tube 140 can be disposed in the wellbore loop 100. In one or more embodiments, the tube 140 can be attached to an end of the drill string 240 (see FIG. 8) used to drill the second wellbore 132, and the drill string 240 of the second wellbore 132 can be pulled through the first wellbore 130, thereby disposing the tube 140 in the wellbore loop 100. In another embodiment, the tube 140 can be attached to an end of the drill string 240 used to drill the first wellbore 130, and the drill string 240 of the first wellbore 130 can be pulled through the second wellbore 132, thereby disposing the tube 140 in the wellbore loop 100. In one or more embodiments, the tube 140 can be fed down the second wellbore 132, and the tube 140 can be attached to the drill head assembly 200 used to drill the first wellbore 130. The drill head assembly 200 of the first wellbore 130 can then be pulled back to the surface 120, thereby disposing the tube 140 in the wellbore loop 100. Other methods for disposing the tube 140 in the wellbore loop 100 are contemplated without departing from the scope of the disclosure.

The tube 140 can be made from a material with a high thermal conductivity. As known in the art, a tube 140 made from a material with a high thermal conductivity facilitates the transfer of heat between a fluid medium 150 flowing through the tube 140 and a medium disposed around the exterior of the tube 140. The tube 140 can be made of, but is not limited to, copper; copper alloys such as C10200, C10300, C10800, C12000, C12200, and C23000; aluminum; iron; galvanized metal; e.g., galvanized iron; polymers; steel; brass; other metals; other alloys; and the like. The tube 140 can be strong enough so that it does not tear as it is being disposed in the wellbore loop 100, and yet rigid enough so that it does not crush under the weight of the surrounding subsurface environment 102.

After the tube 140 is disposed in the wellbore loop 100, a newly created annulus 146 is defined between the tube 140 and the cylindrical wall of the wellbore loop 100. To increase the heat transfer capabilities of the tube 140 in the wellbore loop 100, a geothermal transfer grout 148 can be pumped into and pack the annulus 146. As known in the art, a geothermal transfer grout 148 exhibits high thermal conductivity and can provide an effective heat transfer medium between heat transfer tubing 140 and the surrounding subsurface environment 102.

In one or more embodiments, the fluid medium 150 can enter a supply side 142 of the tube 140 having a temperature that is higher than the temperature of the surrounding subsurface environment 102. The fluid medium 150 can flow down the supply side 142 of the tube 140 and back up a return side 144 of the tube 140 exchanging heat with the cooler subsurface environment 102. When the fluid medium 150 exits the return side 144, the temperature of the fluid medium 150 can be lower than when it entered the supply side 142 of the tube 140.

In another embodiment, the fluid medium 150 can enter the supply side 142 of the tube 140 having a temperature that is lower than the temperature of the surrounding subsurface environment 102. The fluid medium 150 can flow down the supply side 142 and back up the return side 144 of the tube 140 absorbing heat from the warmer subsurface environment 102. When the fluid medium 150 exits the return side 144, the temperature of the fluid medium 150 can be higher than when it entered the supply side 142 of the tube 140.

As shown, the supply side 142 of the tube 140 is disposed in the first segment 104 of the wellbore loop 100, and the return side 144 of the tube 140 is disposed in the second segment 106 of the wellbore loop 100. However, as may be appreciated, the supply side 142 of the tube 140 can be disposed in the second segment 106 of the wellbore loop 100, and the return side 144 of the tube 140 can be disposed in the first segment 104 of the wellbore loop 100.

The supply side 142 and the return side 144 of the tube 140 can be separated by an exchange area 103. The exchange area 103 can be a part of the subsurface environment 102 that is interposed between the supply side 142 and the return side 144 of the tube 140. In one or more embodiments, the exchange area 103 can be configured to substantially eliminate heat transfer between the two sides 142, 144. For example, heat transfer can be substantially eliminated when the supply side 142 and the return side 144 are separated sufficiently far apart that the fluid medium 150 in the supply side 142 has relatively no impact on the fluid medium 150 in the return side 144. As can be appreciated, when the supply side 142 and the return side 144 are disposed in a single vertical wellbore, i.e., no exchange area 103 exists, the fluid medium 150 in the supply side 142 can impact the fluid medium in the return side 144.

If the supply side 142 and the return side 144 of the tube 140 are not sufficiently offset or separated in the wellbore loop 100, the exchange area 103 interposed between them can become saturated and transfer heat between the two sides 142, 144, thereby decreasing heat transfer efficiency. The supply side 142 and the return side 144 of the tube 140 can be separated from one another by any desirable distance or length. For example, the supply side 142 and the return side 144 of the tube 140 can be separated an average distance ranging from a low of about 0.25 m, about 1 m, or about 2 m to a high of about 10 m, about 30 m, or about 50 m. As illustrated in FIG. 1, the distance between the supply side 142 and the return side 144 can vary throughout the depth of the wellbore loop 100.

An exemplary embodiment is used to illustrate how heat transfer between the supply side 142 and the return side 144 of a tube 140 can be substantially eliminated when the tube 140 is disposed through a wellbore loop 100 having an exchange area 103 disposed between the supply side 142 and the return side 144. In the exemplary embodiment, the wellbore loop 100 extends 30 m below the surface 120, the tube 140 is 2.5 cm in diameter, and the ambient temperature of the subsurface environment 102 is 13° C. A heated fluid medium 150 can enter the supply side 142 of the tube 140 at an elevated temperature of 60° C. The fluid medium 150 can cool to about 21° C. as it enters the U-shaped bend 108 at the bottom of the tube 140. The fluid medium 150 can exit the return side 144 of the tube 140 at about 16° C. The exchange area 103 can substantially eliminate heat transfer between the supply side 142 and return side 144, allowing for efficient heat transfer between the fluid medium 150 and the subsurface environment 102.

Figure 2:
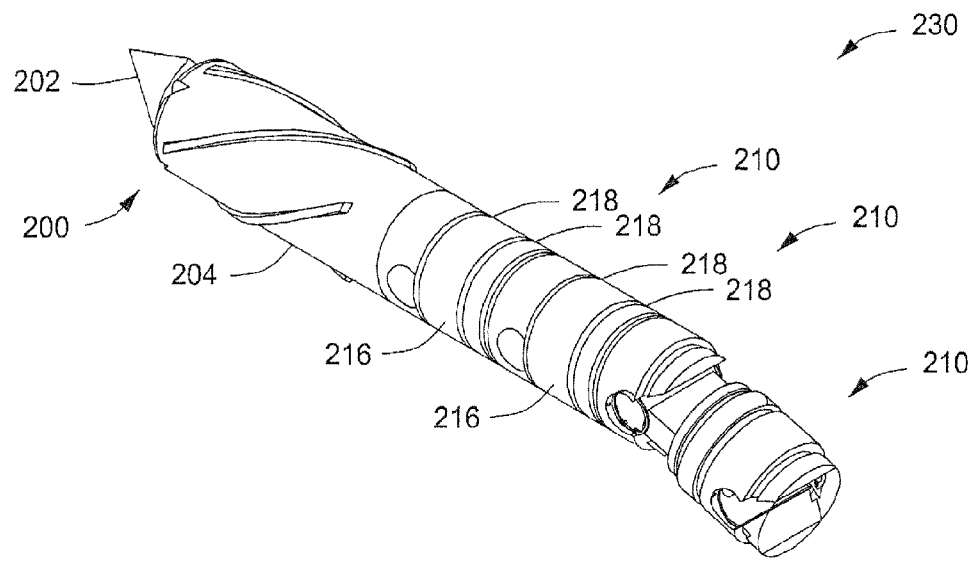
FIG. 2 depicts a perspective view of an illustrative drill head assembly and connection assembly, according to one or more embodiments described.
Figure 3:
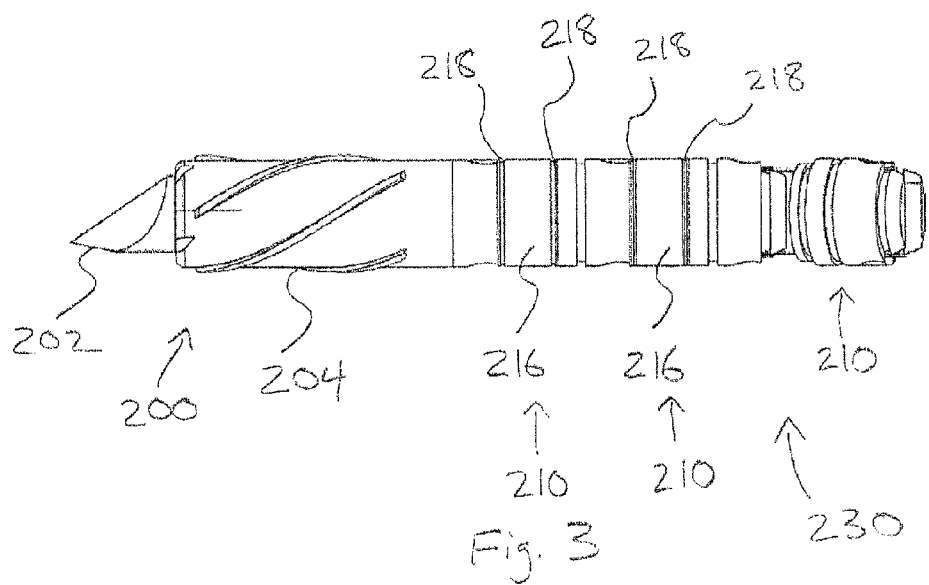
FIG. 3 depicts a side view of the illustrative drill head assembly and connection assembly depicted in FIG. 2, according to one or more embodiments described.

FIG. 2 depicts a perspective view of an illustrative drill head assembly 200 and connection assembly 230, and FIG. 3 depicts a side view of the drill head assembly 200 and connection assembly 230, according to one or more embodiments. Referring to FIGS. 1-3, the drill head assembly 200 can be used to drill the wellbore loop 100 described above. The drill head assembly 200 can include an offset nose 202 nested within a rotating drill head 204. In addition, the drill head assembly 200 can include a clutch and brake assembly, including suitable bearings (not illustrated). The offset nose 202 and the rotating drill head 204 can both rotate contiguously for straight-line drilling. In another embodiment, the clutch and break assembly can decrease or stop the rotation of the offset nose 202 while the rotating drill head 204 continues to rotate for controlled directional drilling.

During drilling operations, the drill head assembly 200 can compact the displaced portion of the subsurface environment 102 into the wall of the wellbore loop 100 rather than transport the displaced portion up to the surface 120. Drilling can be done with or without applying a fluid to the subsurface environment 102.

Coupled to the drill head assembly 200 can be a connection assembly 230. The connection assembly 230 can connect the drill head assembly 200 to the drill string 240 (see FIG. 8). The connection assembly 230 can include a plurality of interconnected knuckles 210. Included in the connection assembly 230 can be a plurality of boots 216 that protect the interior of the connection assembly 230 during drilling operations. The boots 216 can also provide rigidity and shock absorption while allowing for connection assembly 230 bending and flexure. In one or more embodiments, the boots 216 can be made of rubber. Snap rings 218 can be used to secure the boots 216 in place, but other means of securing the boots 216 to the connection assembly 230 are also contemplated without departing from the scope of the disclosure.

Figure 4:
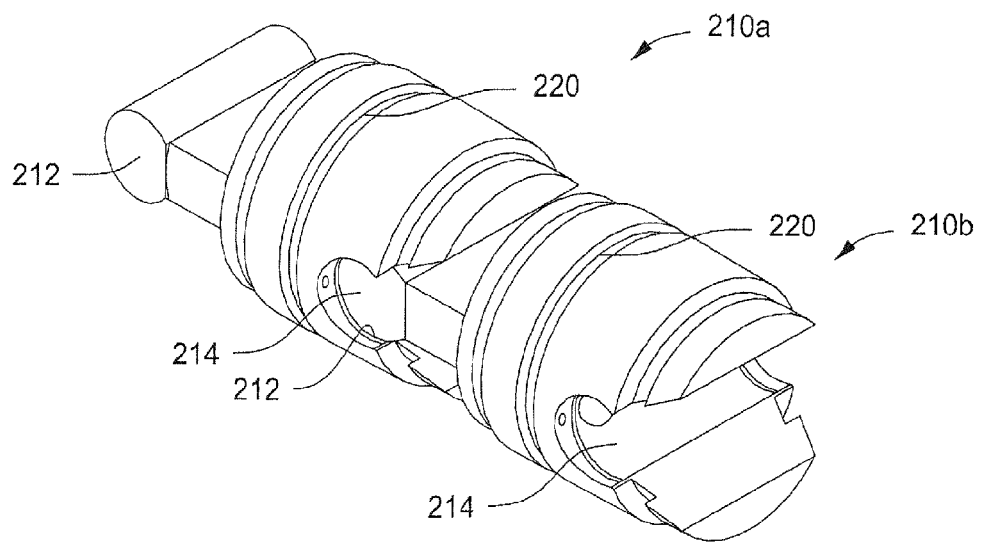
FIG. 4 depicts a perspective view of two illustrative knuckles connected together, according to one or more embodiments described.
Figure 5:
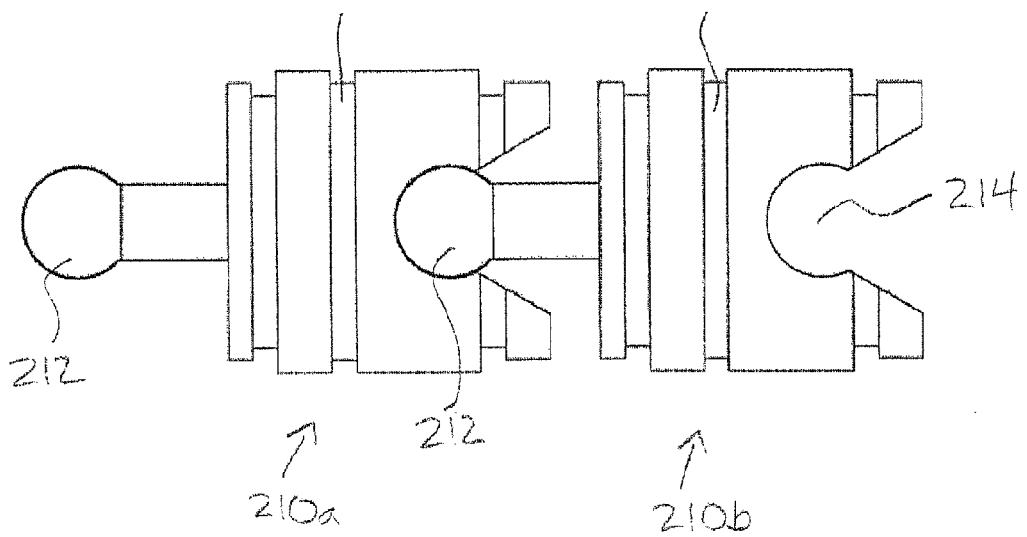
FIG. 5 depicts a side view of the two illustrative knuckles depicted in FIG. 4, according to one or more embodiments described.

FIG. 4 depicts a perspective view of two illustrative knuckles 210 connected together, and FIG. 5 depicts a side view of the two illustrative knuckles 210 connected together, according to one or more embodiments. Referring to FIGS. 4 and 5 with continuing reference to FIGS. 1-3, each knuckle 210 in the connection assembly 230 can define a recess 214 on a first end and a coupler 212 on a second end. The recess 214 of a first knuckle 210a can be configured to receive the coupler 212 of a second knuckle 210b, thereby connecting the first and second knuckles 210a, 210b. In one or more embodiments, the recess 214 of the first knuckle 210a and the coupler 212 of the second knuckle 210b can be precision machined to connect together. The coupler 212 and recess 214 can act as a ball and socket assembly allowing the connection assembly 230 to bend along its length during directional drilling. As can be appreciated, knuckles 210 can be added or removed to alter the length of the connection assembly 230, depending on the application.

Each knuckle 210 can include at least one groove 220. In one or more embodiments, the groove 220 can be at least partially disposed about the circumference of a knuckle 210, as illustrated. The groove 220 can provide a location where the knuckle 210 can be gripped and manipulated by a loop drilling unit 250 (see FIG. 8). Thus, using the groove 220, the connection assembly 230 can either be pushed down into the subsurface environment 102 during drilling operations or pulled up out of the subsurface environment 102.

FIG. 6 depicts an end view of an illustrative knuckle 210 directed toward the coupler 212, and FIG. 7 depicts an end view of an illustrative knuckle 212 directed toward the recess 214, according to one or more embodiments. Referring to FIGS. 6 and 7, each knuckle 210 can define at least one conduit 222 configured to interconnect with the at least one defined conduit 222 in an adjacent knuckle 210. As shown, the knuckles 210 define three conduits 222. The conduits 222 can extend through the interior of the connection assembly 230, and one or more transmission lines (not shown) can extend through the conduits 222. The one or more transmission lines can extend from the drill head assembly 200 (see FIG. 2) to the surface 120 (see FIG. 1). The transmission lines can provide, among other things, hydraulic fluid, electrical power, and electrical signals to the drill head assembly 200. The conduits 222 can include tapered portions 224 disposed within the couplers 212 of the knuckles 210 that can prevent the transmission lines from being pinched when the knuckles 210 bend with respect to one another.

FIG. 8 depicts an illustrative loop drilling unit 250, according to one or more embodiments. The loop drilling unit 250 can include the drill head assembly 200, the connection assembly 230 (see FIG. 2), and a drill string 240. One end of the connection assembly 230 can be attached to the drill head assembly 200 and the other end can be attached to the drill string 240. The drill string 240 can be generally coiled onto a spool 252 for storage and/or transport.

In an exemplary operation of the loop drilling unit 250, the connection assembly 230 and the drill string 240 can pass through a driving device 254. The driving device 254 can grip a selective knuckle 210 of the connection assembly 230 at the groove 220 (see FIG. 5) and either push the knuckle 210 down into the subsurface environment 102 or pull the knuckle 210 up out of the subsurface environment 102. The driving device 254 can also grip the drill string 240 and either push the drill string 240 down into the subsurface environment 102 or pull the drill string 240 up out of the subsurface environment 102. As the connection assembly 230 and drill string 240 are pushed into the subsurface environment 102, the drill string 240 can be unraveled from the spool 252. As the connection assembly 230 and drill string 240 are pulled up out of the subsurface environment 102, the drill string 240 can be re-coiled on the spool 252. In one or more embodiments, the driving device 254 can use a continuous or a semi-continuous thrust. In another embodiment, the driving device 254 can use a stroke type thrust.

In one or more embodiments, the drill string 240 can be a flexible coiled tube string. The coiled tube string can be made of steel or steel alloy. However, other materials are contemplated for the coiled tube string without departing from the scope of the disclosure. In one or more embodiments, the drill string 240 can be capable of passing through the arcuate bottom segment 108 of the wellbore loop 100 (see FIG. 1). In another embodiment, at least part of the drill string 240 can include multiple segments of rigid tube string with joints or knuckles 210 located between the segments to provide the drill string 240 with enough flexibility to pass through the arcuate bottom segment 108 of the wellbore loop 100. In another embodiment, the drill string 240 can include rigid tube and the attached connection assembly 230 can be long enough to extend through the length of the arcuate bottom segment 108 of the wellbore loop 100. In yet another embodiment, the drill string 240 can be made entirely of knuckles 210.

The loop drilling unit 250 can be mounted on a skid steer track unit 256, thereby providing the drilling unit 250 with mobility. The loop drilling unit 250 can also include wheels (not shown). In one or more embodiments, the loop drilling unit 250 can rotate as a turret either about the skid steer track unit 256 or about the driving device 254. Thus, the loop drilling unit 250 can be manipulated and moved to areas where wellbore loops 100 are to be drilled and completed.

Figure 9:
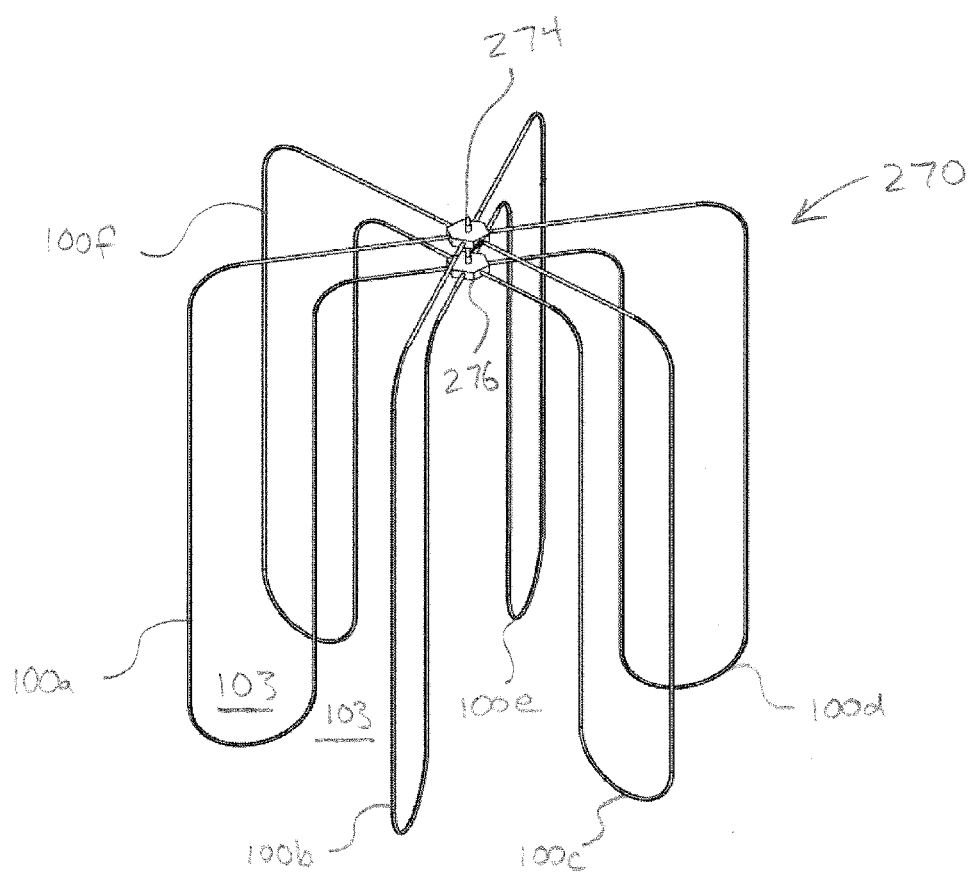
FIG. 9 depicts a perspective view of an illustrative wellbore loop system including a plurality of rotationally offset wellbore loops, according to one or more embodiments described.
Figure 10:
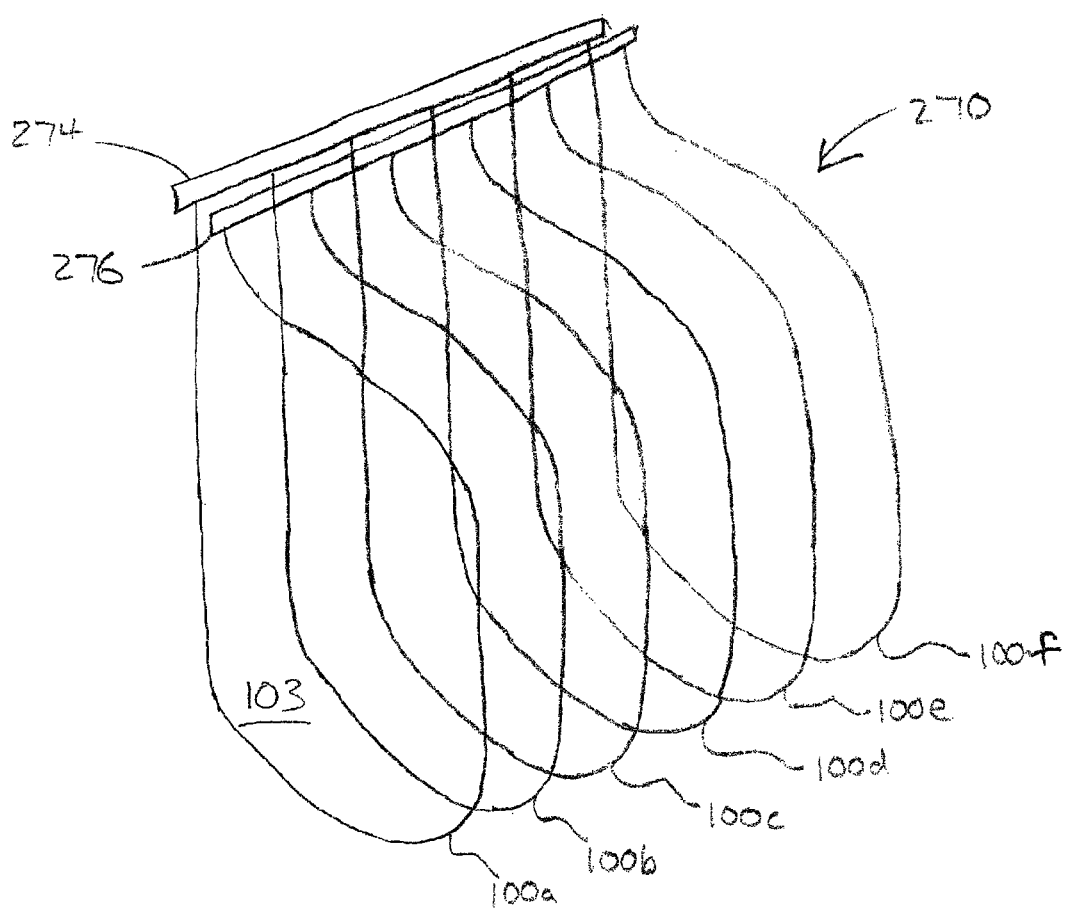
FIG. 10 depicts a perspective view of an illustrative wellbore loop system including a plurality of laterally offset wellbore loops, according to one or more embodiments described.

FIG. 9 depicts a perspective view of an illustrative wellbore loop system 270 including a plurality of rotationally offset wellbore loops 100a-f, and FIG. 10 depicts a perspective view of an illustrative wellbore loop system 270 including a plurality of laterally offset wellbore loops 100a-f, according to one or more embodiments. As can be appreciated, the number of wellbore loops 100 can vary depending on requirements, i.e., the fluid medium 150 used, the permeability of the subsurface environment 102 for heat transfer, and the amount of heat transfer required. In one or more embodiments, the wellbore loop system 270 can be configured to provide maximum heat transfer capabilities in a localized area. FIGS. 9 and 10 depict two possible wellbore loop system 270 layouts, and it is understood that the disclosed layouts are merely examples and are not intended to limit the scope of the claims presented herein.

Referring to FIG. 9, the plurality of wellbore loops 100a-f can be rotationally or radially offset about an axis. The loop drilling unit 250 can drill a first wellbore loop 100a, rotate about a fixed point such as the skid steer track unit 256 (see FIG. 8) or the driving device 254 (see FIG. 8), and drill a second wellbore loop 100b.

Referring to FIG. 10, the plurality of wellbore loops 100a-f can be laterally offset. The loop drilling unit 250 can drill a first wellbore loop 100a, move a distance laterally from the first wellbore loop 100a, and drill second wellbore loop 100b. In one or more embodiments, the laterally offset wellbore loops 100a-f can be parallel to one another.

Referring to FIGS. 9 and 10, a supply line (not shown) can be configured to transport the fluid medium 150 (not shown) to an inlet 274. The inlet 274 can be configured to direct the fluid medium 150 to the plurality of wellbore loops 100a-f for heat transfer to take place. After flowing through the wellbore loops 100a-f, the temperature-altered fluid medium 150 can return to an outlet 276. The outlet 276 can be configured to funnel the temperature-altered fluid medium 150 from the plurality of wellbore loops 100a-f into a single return line (not shown). In one or more embodiments, there can be an insulation barrier (not shown) between the inlet 274 and the outlet 276 to prevent or minimize heat transfer between the fluid medium 150 flowing through inlet 274 and the temperature-altered fluid medium 150 flowing through the outlet 276. In another embodiment, the supply line and return line can be insulated for the same purpose. In one or more embodiments, the inlet 274 and the outlet 276 can be an integrated device, as shown in FIG. 9.

The wellbore loops 100a-f can be generally separated by the exchange area 103, as explained above. The first wellbore loop 100a and second wellbore loop 100b can be rotationally and/or laterally offset to provide an exchange area 103 to substantially eliminate heat transfer between the first wellbore loop 100a and the second wellbore loop 100b. If the first wellbore loop 100a and the second wellbore loop 100b are not sufficiently offset, the exchange area 103 interposed between the two wellbore loops 100a, 100b can become saturated and transfer heat between the first wellbore loop 100a and the second wellbore loop 100b, thereby decreasing heat transfer efficiency.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for forming a geothermal well, comprising:
   drilling a first wellbore having a substantially linear segment connected to an arcuate segment;
   drilling a second wellbore to connect to a terminating end of the arcuate segment, thereby forming a first wellbore loop; and
   disposing a thermally conductive tube through the first wellbore loop, wherein:
   the substantially linear segment has a first end located at a surface and a second end connected to the arcuate segment,
   the second wellbore has a third end located at the surface and a fourth end connected to the terminating end of the arcuate segment, and
   a distance between the first end and the third end is less than a distance between the second end and the fourth end.

2. The method of claim 1, wherein the substantially linear segment and the second wellbore are offset a distance to substantially eliminate geothermal heat transfer between the substantially linear segment and the second wellbore, and wherein the distance between the first end and the third end is about 0.25 m to about 5 m.

3. The method of claim 1, wherein a subsurface environment is disposed between the substantially linear segment and the second wellbore, the subsurface environment including at least one of dirt, sand, clay, silt, and rock, wherein the first wellbore has a first diameter and the second wellbore has a second diameter, and the first diameter is greater than the second diameter.

4. The method of claim 1, further comprising pumping a geothermal transfer grout into an annulus defined between the thermally conductive tube and a wellbore loop wall.

5. The method of claim 1, wherein the first wellbore is drilled with a directional drilling assembly, and the second wellbore is drilled with a straight-line drilling assembly.

6. The method of claim 1, wherein the second wellbore is substantially linear and angled with respect to vertical.

7. The method of claim 1, wherein the first wellbore is substantially vertical, and the second wellbore is substantially linear and angled with respect to vertical.

8. The method of claim 1, wherein:
the thermally conductive tube is made from a material comprising copper,
the first wellbore is substantially vertical,
the second wellbore is substantially linear and angled with respect to vertical
the distance between the first end and the third end is about 0.25 m to about 5 m,
the first wellbore has a first diameter and the second wellbore has a second diameter,
the first diameter is greater than the second diameter,
the first wellbore is drilled with a directional drilling assembly, and
the second wellbore is drilled with a straight-line drilling assembly.

9. The method of claim 1, further comprising forming a second wellbore loop, wherein the second wellbore loop is laterally offset with respect to the first wellbore loop.

10. The method of claim 1, further comprising forming a second wellbore loop, wherein the first wellbore loop and the second wellbore loop are radially offset from one another about an axis.

11. The method of claim 1, wherein the first wellbore is substantially vertical, wherein the second wellbore is substantially linear and angled with respect to vertical, wherein the distance between the first end and the third end is about 0.25 m to about 5 m, wherein the first wellbore has a first diameter and the second wellbore has a second diameter, and wherein the first diameter is about 3 times greater than the second diameter.

12. The method of claim 1, wherein the distance between the first end and the third end is within about 1 meter.

13. A method for exchanging heat between a fluid and a subsurface environment, comprising
flowing a fluid through a thermally conductive tube disposed in a wellbore loop, the wellbore loop comprising:
a first wellbore having a substantially linear segment connected to an arcuate segment; and
a second wellbore connected to a terminating end of the arcuate segment, wherein:
the substantially linear segment has a first end located at a surface and a second end connected to the arcuate segment,
the second wellbore has a third end located at the surface and a fourth end connected to the terminating end of the arcuate segment,
a distance between the first end and the third end is less than a distance between the second end and the fourth end,
the tube and a wellbore loop wall define an annulus therebetween that is filled with a geothermal transfer grout,
the first wellbore is substantially vertical,
the second wellbore is substantially linear and angled with respect to vertical, and
the distance between the first end and the third end is about 0.25 m to about 5 m.

14. The method of claim 13, wherein the substantially linear segment and the second wellbore are separated by a distance to substantially eliminate geothermal heat transfer between the substantially linear segment and the second wellbore.

15. The method of claim 13, wherein:
a subsurface environment is disposed between the substantially linear segment and the second wellbore, the subsurface environment including at least one of dirt, sand, clay, silt, and rock,
the first wellbore has a first diameter and the second wellbore has a second diameter,
the first diameter is greater than the second diameter,
the first wellbore is drilled with a directional drilling assembly, and
the second wellbore is drilled with a straight-line drilling assembly.

16. A method for forming a geothermal well, comprising:
drilling a first substantially linear segment from a first point located at a surface to a second point located in a subsurface environment;
drilling a second substantially linear segment from a third point located at the surface to a fourth point located in the subsurface environment, the first and second substantially linear segments being separated by a distance to prevent geothermal heat transfer between the first and second substantially linear segments;
drilling a third arcuate segment from the fourth point to the second point or from the second point to the fourth point, thereby forming a wellbore loop; and
disposing a thermally conductive tube through the wellbore loop, wherein the distance between the first and second substantially linear segments is greater between the second and fourth points than between the first and third points.

17. The method of claim 16, wherein:
the first wellbore is substantially vertical,
the second wellbore is substantially linear and angled with respect to vertical
the distance between the first end and the third end is about 0.25 m to about 5 m,
the first wellbore has a first diameter and the second wellbore has a second diameter,
the first diameter is greater than the second diameter,
the first wellbore is drilled with a directional drilling assembly, and
the second wellbore is drilled with a straight-line drilling assembly.

18. The method of claim 16, wherein the first and third points are located within about 5 meters of each other.

19. The method of claim 16, wherein the third arcuate segment is drilled from the second point to the fourth point, wherein the first substantially linear segment and the third arcuate segment each have a diameter of about 7.5 cm, and wherein the second substantially linear segment has a diameter of about 2.5 cm.

* * * * *